(12) United States Patent
Conley et al.

(10) Patent No.: US 9,082,522 B2
(45) Date of Patent: Jul. 14, 2015

(54) ZONE COMPENSATED MULTILAYER LAUE LENS AND APPARATUS AND METHOD OF FABRICATING THE SAME

(75) Inventors: Raymond P. Conley, Manorville, NY (US); Chian Qian Liu, Bolingbrook, IL (US); Albert T. Macrander, Naperville, IL (US); Hanfei Yan, Center Moriches, NY (US); Jorg Maser, Oak Park, IL (US); Hyon Chol Kang, Gwangju (KR); Gregory Brian Stephenson, Lisle, IL (US)

(73) Assignee: Brookhaven Science Associates, LLC, Upton, NY (US)

( * ) Notice: Subject to any disclaimer, the term of this patent is extended or adjusted under 35 U.S.C. 154(b) by 596 days.

(21) Appl. No.: 13/515,780

(22) PCT Filed: Dec. 13, 2010

(86) PCT No.: PCT/US2010/060057
§ 371 (c)(1),
(2), (4) Date: Oct. 14, 2013

(87) PCT Pub. No.: WO2011/142782
PCT Pub. Date: Nov. 17, 2011

(65) Prior Publication Data
US 2014/0072106 A1    Mar. 13, 2014

Related U.S. Application Data

(60) Provisional application No. 61/286,273, filed on Dec. 14, 2009.

(51) Int. Cl.
*G21K 1/06* (2006.01)
*B82Y 10/00* (2011.01)

(52) U.S. Cl.
CPC ............... *G21K 1/062* (2013.01); *B82Y 10/00* (2013.01); *G21K 2201/067* (2013.01); *Y10T 156/10* (2015.01)

(58) Field of Classification Search
CPC ........... G21K 1/062; G21K 1/06; G21K 1/02; G21K 1/025; G21K 2201/067; A61B 6/06; A61B 6/0306; Y10T 156/10; B82Y 10/00
USPC ..................................... 378/145, 146, 84, 70
See application file for complete search history.

(56) References Cited

U.S. PATENT DOCUMENTS

| 7,597,475 | B1 | 10/2009 | Shu et al. | |
| 2002/0044626 | A1* | 4/2002 | Verman et al. | 378/84 |

(Continued)

FOREIGN PATENT DOCUMENTS

EP    0355496 A2    2/1990

OTHER PUBLICATIONS

Kang, H., et al., "Nanometer Linear Focusing of Hard X Rays by a Multilayer Laue Lens," *Physical Review Letters*, vol. 96, pp. 127401-1 to 127401-4, (2006).

(Continued)

*Primary Examiner* — Irakli Kiknadze
(74) *Attorney, Agent, or Firm* — Dorene M. Price

(57) ABSTRACT

A multilayer Laue Lens includes a compensation layer formed in between a first multilayer section and a second multilayer section. Each of the first and second multilayer sections includes a plurality of alternating layers made of a pair of different materials. Also, the thickness of layers of the first multilayer section is monotonically increased so that a layer adjacent the substrate has a minimum thickness, and the thickness of layers of the second multilayer section is monotonically decreased so that a layer adjacent the compensation layer has a maximum thickness. In particular, the compensation layer of the multilayer Laue lens has an in-plane thickness gradient laterally offset by 90° as compared to other layers in the first and second multilayer sections, thereby eliminating the strict requirement of the placement error.

17 Claims, 7 Drawing Sheets

(56) References Cited

U.S. PATENT DOCUMENTS

2008/0137810 A1     6/2008  Liu et al.
2009/0072150 A1*    3/2009  Trissel .................... 250/363.01

OTHER PUBLICATIONS

Kang, H., et al., "Sectioning of multilayers to make a multilayer Laue Lens," *Review of Scientific Instruments*, vol. 78, pp. 046103-1 to 046301-3, (2007).

Huang, X., et al., "11nm hard X-ray focus from a large-aperture multilayer Laue lens," *Scientific Reports*, vol. 3, No. 3, pp. 1-5, (2013).

International Search Report of International Application PCT/US2010/060057—Date mailed: Sep. 11, 2011, 4 pages.

Written Opinion of the Searching Authority of International Application No. PCT/US2010/060057—Date mailed: Sep. 11, 2011, 4 pages.

Conley, R., et al., "Wedged Multilayer Laue Lens," *Review of Scientific Instruments*, vol. 79, pp. 053104-1 to 053104-4, 2008.

Conley, R., et al., "The NSLS-II Multilayer Laue Lens Deposition System," *Proceedings of SPIE (International Society for Optics and Photonics) Conference: Advances in X-Ray/EUV Optics and Components IV*, vol. 7448, San Diego, California, Aug. 2, 2009, [online] [retrieved Dec. 9, 2013], <URL: http://proceedings.spiedigitallibrary.org/proceeding.aspx?articleid=1341173>.

\* cited by examiner

ZONE COMPENSATED MULTILAYER LAUE LENS AND APPARATUS AND METHOD OF FABRICATING THE SAME

CROSS-REFERENCE TO RELATED APPLICATIONS

This application claims priority to U.S. Provisional Patent Application No. 61/286,273 which was filed on Dec. 14, 2009, the entirety of which is incorporated by reference as if fully set forth in this specification.

STATEMENT OF GOVERNMENT LICENSE RIGHTS

The present invention was made with Government support under contract number DE-AC02-98CH10886, awarded by the U.S. Department of Energy. The Government has certain rights in the invention.

BACKGROUND

I. Field of the Invention

This invention relates generally to an X-ray focusing system. In particular, the present invention relates to a Multilayer Laue Lens (MLL) configured to focus hard X-rays in a transmission geometry and to a fabrication method of making an MLL.

II. Background of the Related Art

Modern synchrotron-radiation facilities provide unprecedented levels of intensity and collimation in X-ray beams and offer tremendous research opportunities. The development of improved X-ray focusing optics is essential for further advances in various areas such as X-ray microimaging and microanalysis applications.

Focusing optics for X-rays differ from those for visible light, as the refractive index of solids is slightly smaller than unity for X-rays and significantly greater than unity for visible light. Reflective X-ray mirrors, such as elliptical Kirkpatrick-Baez (KB) mirrors and tapered hollow capillaries, can be used only at very small grazing angles below the critical angle of the reflecting material. Moreover, hard X-rays, those with wavelengths shorter than 0.1 nm, are notoriously hard to focus. Traditional lenses fail to bend hard X-rays because their index of refraction is very close to unity in this part of the spectrum. Even smooth surfaces reflect hard X-rays at only an extremely glancing angle.

Traditional zone plates for X-ray focusing optics are fabricated using lithographic techniques with metal electroplating on silicon nitride membranes. For efficient focusing of hard X-rays, a very large aspect ratio is required, which presents a formidable challenge for the manufacturing process. To achieve a high aspect ratio of zone depth to width, a mask with the zone-plate pattern is first made using e-beam lithography. X-ray lithography is then used, with a thick photoresist and subsequent metal electroplating on silicon nitride membranes, for zone-plate fabrication. Tremendous progress has been made in this field, and very recently, a spatial resolution of 60 nm was achieved for 8 keV hard X-rays, using zone plates with a 50 nm outermost zone width and 1 μm zone depth with gold as the zone material. However, as the desired zone width becomes smaller and zone depth larger, the manufacturing process becomes increasingly difficult.

Researchers at UChicago Argonne, LLC (Chicago, Ill., US) designed a non-traditional type of lens that uses diffraction to focus the high-energy beams into a tiny region. The device is called a multilayer Laue lens (MLL), because it diffracts X-rays in a transmission geometry, rather than a reflection geometry. An exemplary MLL was made out of 728 layers of silicon (Si) and tungsten silicide ($WSi_2$) sputtered onto a silicon wafer substrate. See, e.g., U.S. Pat. No. 7,440,546 B2 to Liu et al., the disclosure of which is incorporated by reference in this specification.

FIG. 1 of the present specification illustrates cross sections of the multilayer sections of different types of Multilayer Laue Lens known in the art such as (a) a flat-type MLL 102, (b) a wedge-type MLL 104, and (c) a tilt-type MLL 106 (c). Each of the MLLs of FIG. 1 is a multilayer device configured to focus hard X-rays by X-ray diffraction, and obeys the zone-plate law, while having a different shape and fabrication method, as compared to the traditional zone-plates. Each of the MLLs is formed with substantially identical first and second multilayer sections formed with a plurality of alternating layers of selected materials. It is also noted that each of the multilayer sections has a monotonically increasing thickness from a minimum thickness adjacent the outer most zone and a maximum thickness of near the central portion nearest to an optical axis (OA) of the device.

It has been known that the optical performance of the MLLs strongly depend on the angle of the layers with respect to the incident beams. In particular, the wedge-type MLL is known to show a better focusing efficiency than other type of MLLs, such as the flat-type and tilt-type MLLs, because each of the layers in the multilayer sections of the wedge-type MLL satisfies the Bragg condition, $\theta_B \approx \lambda/2\Lambda$ and $\Lambda (r_n) \equiv r_n - r_{n-2} \approx \lambda f/r_n$, where $r_n$ is the distance from the $n^{th}$ interface to the optical axis and f is the focal length, so that the focusing efficiency of the lens is improved.

However, in order to obtain the in-phase interference of radiation at the focus, each of zone-pair from both halves of an MLL must be separated from the center of the device by a predetermined distance. Specifically, an individual layer placement error should be less than approximately one-third of the thickness of that particular layer, and this rule applies to all of the layers in the multilayer sections of the device stack. Because the thickness of layers in the multilayer sections monotonically decreases in the MLL, as the distance of the layers in question to the center of the MLL increases, the allowable error in an absolute placement distance also decreases as the distance of the layers in question to the center of the MLL increases. For the inner zones where the thickness of the layers is relatively thicker, satisfying the placement requirement may be reasonable. However, meeting the placement requirement may be extremely difficult for the outermost zones not only because the thickness of the layers is relatively thinner, but also the placement errors of all previous zones are accumulated.

For example, assuming that the illumination area spans over 100 μm in the horizontal direction of an MLL, and the minimum thickness of the outermost zone of the MLL is 1 nm, the separation uniformity of the outermost zone-pair must be within 3 angstrom (Å) over the 100 μm illumination range. However, due to accumulated errors and system drifts during the growth of the multilayer thin films, this is an increasingly-difficult criterion to meet, especially when the thickness of the outermost zones approaches the sub-nanometer scale.

Accordingly, it is an objective to provide a structure of a MLL device, and an apparatus and method of fabricating the MLL device that can effectively address the disadvantages and problems associated with conventional MLL device structures.

Another goal is to eliminate the strict requirement of zone compensation placement error inherent in the fabrication process of the prior MLL device structures.

SUMMARY

In accordance with an exemplary embodiment, a multilayer Laue Lens is provided that includes a compensation layer formed in between a first multilayer section and a second multilayer section. Each of the first and second multilayer sections includes a plurality of alternating layers made of a pair of two different materials. In particular, the compensation layer of the multilayer Laue lens has an in-plane thickness gradient laterally offset by 90°, as compared to other layers in the first and second multilayer sections, thereby eliminating the strict requirement of the placement error.

In accordance with an aspect of the multilayer Laue lens, it includes a first multilayer section comprising a plurality of alternating layers made of a pair of two different materials on a substrate. The multilayer Laue lens also includes a compensation layer formed on the first multilayer section, and a second multilayer section formed on the compensation layer. The second multilayer section also includes a plurality of alternating layers made of a pair of two different materials. In particular, the compensation layer is formed in such a way that the in-plane thickness gradient of the compensation layer is laterally offset by 90°, as compared to other layers in the first and second multilayer sections.

In particular, each of the alternating layers in the first and second multilayer sections has an in-plane thickness gradient to form a wedge-type multilayer Laue lens. Specifically, the thickness of the layers of the first multilayer section is monotonically increased, so that a layer adjacent the substrate has a minimum thickness, and the thickness of the layers of the second multilayer section is monotonically decreased, so that a layer adjacent the compensation layer has a maximum thickness. Preferably, the pair of two different materials is manufactured from at least one of $WSi_2/Si$, $W/Si$, $W/B_4C$, $W/C$, $Mo/Si$, $MoSi_2/Si$, $Mo/B_4C$, $Ni/B_4C$ and $Al_2O_3/B_4C$ pairs.

In a method for making a multilayer Laue lens is disclosed, the method forms a first multilayer section that includes a plurality of alternating layers made of a pair of two different materials. The method forms a compensation layer on the first multilayer section in such a way that an in-plane thickness gradient of the compensation layer is laterally offset by 90° as compared to other layers in the first and second multilayer sections. The method then forms the second multilayer section that includes a plurality of alternating layers made of a pair of two different materials.

In particular, the method forms the first and second multilayer sections in such a way that each of the alternating layers of the first and second multilayer sections has an in-plane thickness gradient to form a wedge-type multilayer Laue lens. Specifically, the method forms the first multilayer section on a substrate in such a way that thickness of the alternating layers is monotonically increased so that a layer adjacent the substrate has a minimum thickness. Preferably, the method forms the pair of two different materials using at least one of $WSi_2/Si$, $W/Si$, $W/B_4C$, $W/C$, $Mo/Si$, $MoSi_2/Si$, $Mo/B_4C$, $Ni/B_4C$ and $Al_2O_3/B_4C$ pairs. Specifically, the method forms the first multilayer section and the compensation layer on a substrate, and the second multilayer section on a separate substrate different from the substrate. Moreover, the method bonds the substrate having the first multilayer section and the compensation layer, and the separate substrate having the second multilayer section, thereby forming a complete multilayer Laue lens. Furthermore, the bonding is performed in such a way that the alternating layers of the first multilayer section is symmetrical to the alternating layers of the second multilayer section along with an optical axis of the device. Preferably, the method utilizes a sputtering system to form the first and second multilayer sections, and the compensation layer. Specifically, the sputtering system includes a plurality of linearly-aligned sputtering guns.

In accordance with yet another aspect of the present MLL, an X-ray focusing system includes a light source that generates an X-ray to be focused. The X-ray focusing system also includes a grid configured to receive the multilayer Laue lens having a compensation layer formed in between the first and second multilayer sections. In particular, the compensation layer has an in-plane thickness gradient laterally offset by 90°, as compared to other layers in the first and second multilayer sections, thereby eliminating the strict requirement of the placement error. The X-ray focusing system further includes a scanning mechanism configured to scan the multilayer Laue lens using the X-rays, thereby locating an area of the multilayer Laue lens that shows a focusing efficiency better than a predetermined value.

These and other objectives of the present invention will become more apparent from the following description and illustrative embodiments, which are described in detail with reference to the accompanying drawings. Similar elements in each accompanying figure are designated by like reference numbers and, hence, subsequent detailed descriptions thereof may be omitted for brevity.

DETAILED DESCRIPTION OF THE INVENTION

The present invention utilizes a central compensation layer formed in between the multilayer sections of a MLL, thereby eliminating the strict requirement due to placement error. In the interest of clarity, the following terms and acronyms are defined as provided below.

Definitions

Bragg condition: A formula that defines specific wavelengths and incident angles that yields intense peaks of reflected radiation. The path difference between two waves (2d sin θ) equals to nλ, where d is the distance between two medium that the waves pass, θ is a scattering angle, n is an integer, and λ is a wavelength of the radiation.

Multilayer Laue Lens (MLL): A type of zone-plate device used to focus X-rays using diffraction. MLL is developed by scientists at UChicago Argonne, LLC (Chicago, Ill., US).

X-ray: A form of electromagnetic radiation. X-rays have a wavelength in the range of 10 to 0.01 nanometers, corresponding to frequencies in the range 30 petahertz to 30 exahertz ($3 \times 10^{16}$ Hz to $3 \times 10^{19}$ Hz) and energies in the range 120 eV to 120 keV.

Zone-plate: A device used to focus X-rays using diffraction.

Figure 1:
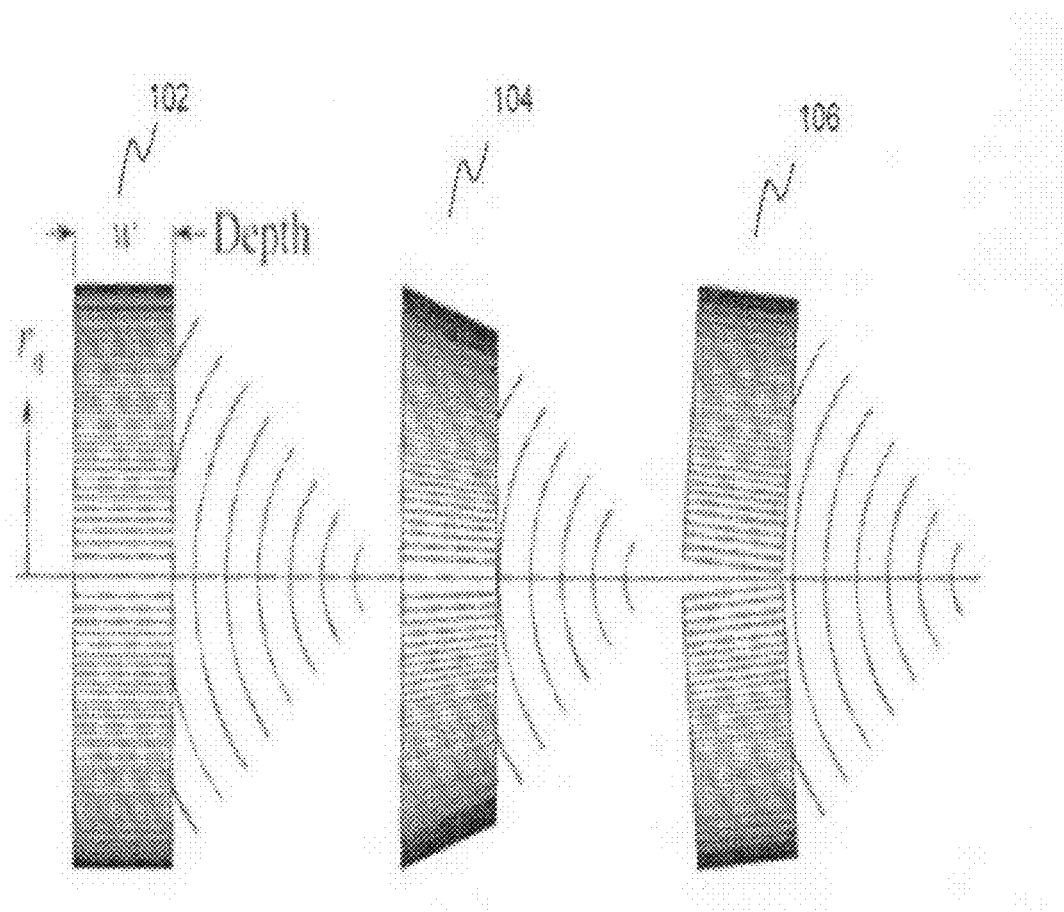
FIG. 1 illustrates cross sections of the multilayer sections of different types of Multilayer Laue Lens types known in the art.
Figure 2:
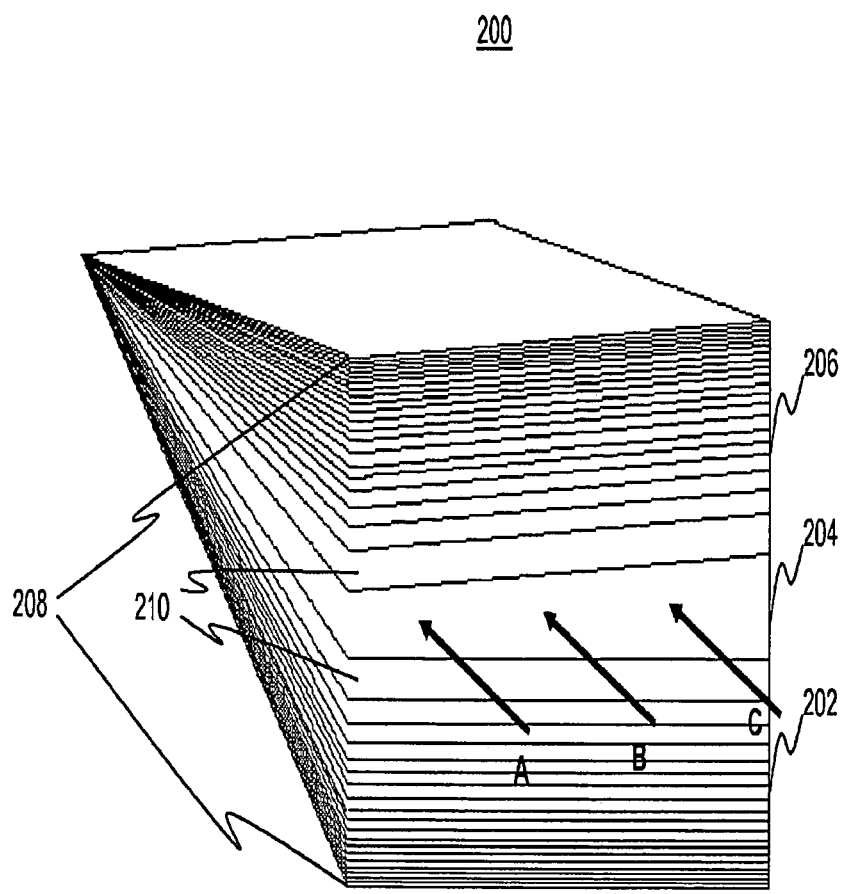
FIG. 2 illustrates a layer structure of wedge-type MLL 200, as contemplated by one embodiment.

FIG. 2 illustrates a layer structure of wedge-type MLL 200 as contemplated by one embodiment. Like other types of MLLs, the X-rays irradiated into the wedge-type MLL along the arrows indicated as A, B, C are diffracted in Laue transmission geometry by a specific arrangement of the alternating layers of a selected material system. The present wedge-type MLL includes a first multilayer section 202, a compensation layer 204, and a second multilayer section 206 formed on a substrate (not shown). The multilayer sections 202, 206 of the wedge-type MLL may be formed with a plurality of alternating layers made of a pair of two different materials that have a good electron density contrast and little chemical interaction to avoid interfacial mixing. In this embodiment, tungsten silicide ($WSi_2$) and silicon (Si) are used for the alternating layers of the multilayer sections 202, 206, and the compensation layer is made out of a single layer of $WSi_2$. Alternatively, the multilayer sections may be formed with different material systems such as W/Si, W/$B_4$C, W/C, Mo/Si, $MoSi_2$/Si, Mo/$B_4$C, Ni/$B_4$C, $Al_2O_3$/$B_4$C. Also, each of the multilayer sections 202, 206 has a monotonically increasing thickness from a minimum thickness at the outer most zones 208 and a maximum thickness near the innermost zones 210.

Referring further to FIG. 2, it is noted that each of the layers of multilayer sections 202, 206 is grown with an in-plane thickness gradient to form a wedge shape along the optical axis direction also indicated by arrows A, B, C. For example, the in-plane thickness gradient is applied in such a way that $n_{th}$ zone tilt angle equals to $r_n/2f$ for a local Bragg condition where $r_n$ is the distance from the $n^{th}$ interface to the optical axis and f is the focal length, so all zones are shrunk by the same factor (w/2f), with w being section thickness. As a result, while each interface between the layers may be either flat, parabolic or elliptical depending on the focal size and efficiency of an MLL, the angle of each interface with respect to the optical axis varies monotonically, so that each interface complies with the local Bragg condition to maximize the focusing efficiency.

Figure 3:
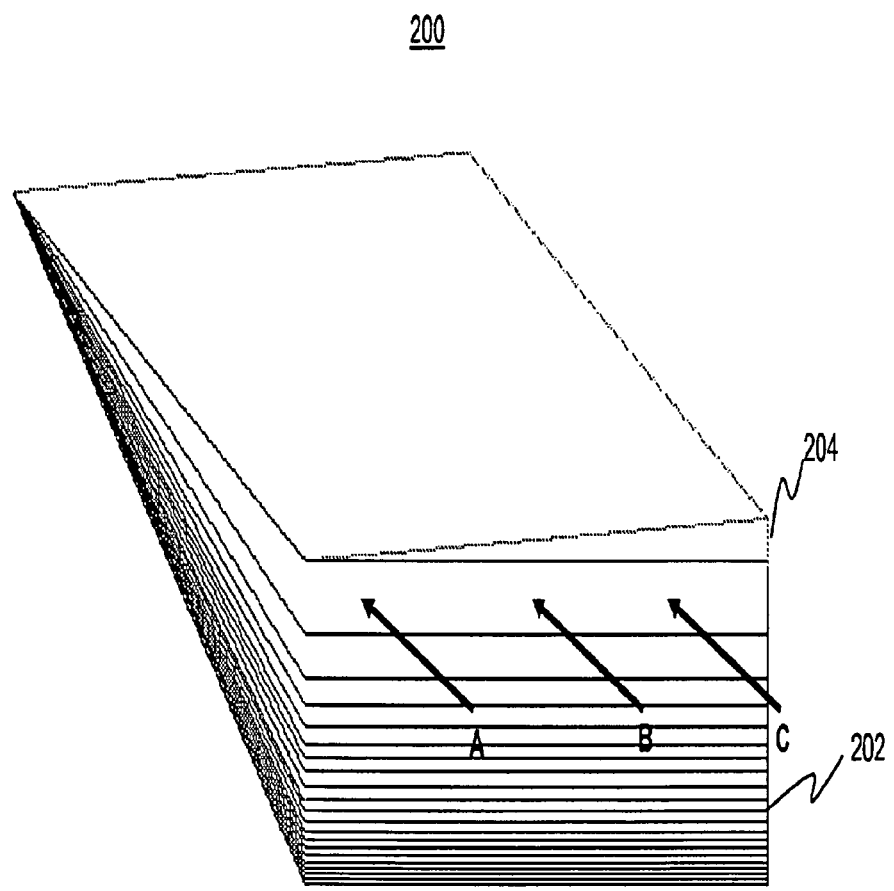
FIG. 3 depicts the layer structure of first multilayer section 202 and compensation layer 204 of wedge-type MLL 200 as illustrated in FIG. 2.

FIG. 3 depicts the layer structure of first multilayer section 202 and compensation layer 204 of wedge-type MLL 200 as illustrated in FIG. 2. It is noted that second multilayer section 206 is omitted in FIG. 3 to better illustrate the structure of compensation layer 204. In particular, compensation layer 204 is formed on first multilayer section 202 in such a way that the direction of the wedge angle is laterally offset by 90° as compared to the other layers of the first multilayer section 202. Compensation layer 204 may be formed with a selected material such as tungsten silicide ($WSi_2$).

To satisfy the ⅓ layer position error, a certain location across the structure is found by x-ray scanning. Although, the separation uniformity of the outermost zones of a fabricated MLL must be within approximately one-third of the thickness of the outermost zones, it is normal that the thickness gradient across the length of the entire device greatly exceeds the thickness of these outermost zones. As a result, a scanning procedure is performed in which the fabricated MLL device is irradiated and scanned with X-rays to find a region of the MLL device that shows a best focusing efficiency.

Central compensation layer 204 formed laterally offset by 90° in between the first and second multilayer sections 202, 206 of wedge-type MLL 200 has the effect of improving the overall horizontal uniformity of the multilayer sections of the MLL device. It is normal that there exists a slight thickness gradient caused by the non-uniformity in the layers of the multilayer sections over an entire substrate, thereby causing local positioning displacements for the multilayer sections. If an additional layer is formed in between the first and second multilayer sections with the same thickness gradient as the multilayer sections but laterally offset by 90°, the layer will actually "compensate" for the positioning displacements over the entire substrate, thereby eliminating the strict requirement of the placement error.

For example, assuming that each of the layers in the first and second multilayer sections has a total growth accuracy of about 60 nm over 100 μm range, a compensation layer, having a thickness of 60 nm in which the overall thickness will vary by +/−30 nm, will provide more than 100 effective locations for MLL samples that have a 1 nm outermost zone. It is noted that an MLL having a 1 nm outermost zone requires less than 0.3 nm (3 Å) position displacement, and 30 nm divided by 0.3 nm gives 100 effective locations. In an exemplary embodiment, having an outermost zone with 1 nm thickness, the variation with a 100 μm horizontal acceptance is only about +/−1.5 Å with the compensation layer, satisfying the placement requirement.

Also, it is to be understood that although the concept of the present MLL has been explained using a wedge-type MLL, the same concept may well be applied to other types of MLLs such as for example, a flat-type, tilt-type and curve-type MLLs.

Multilayer sections 202, 206 and compensation layer 204 of wedge-type MLL 200 may be fabricated using any thin film deposition apparatus capable of growing thin films with controlled thickness. Also, the in-plane thickness gradient within each layer of wedge-type MLL 200 may be achieved by any thin film growing techniques such as a dynamic masking or a velocity profiling, which are well known in the art. Specifically, the present method utilizes a sputtering system equipped with a mask specifically designed for the deposition of the multilayer sections and the compensation layer. It is to be understood that the sputtering system is also configured to control the speed of the substrate for the velocity profiling required during growth of the compensation layer.

Figure 4:
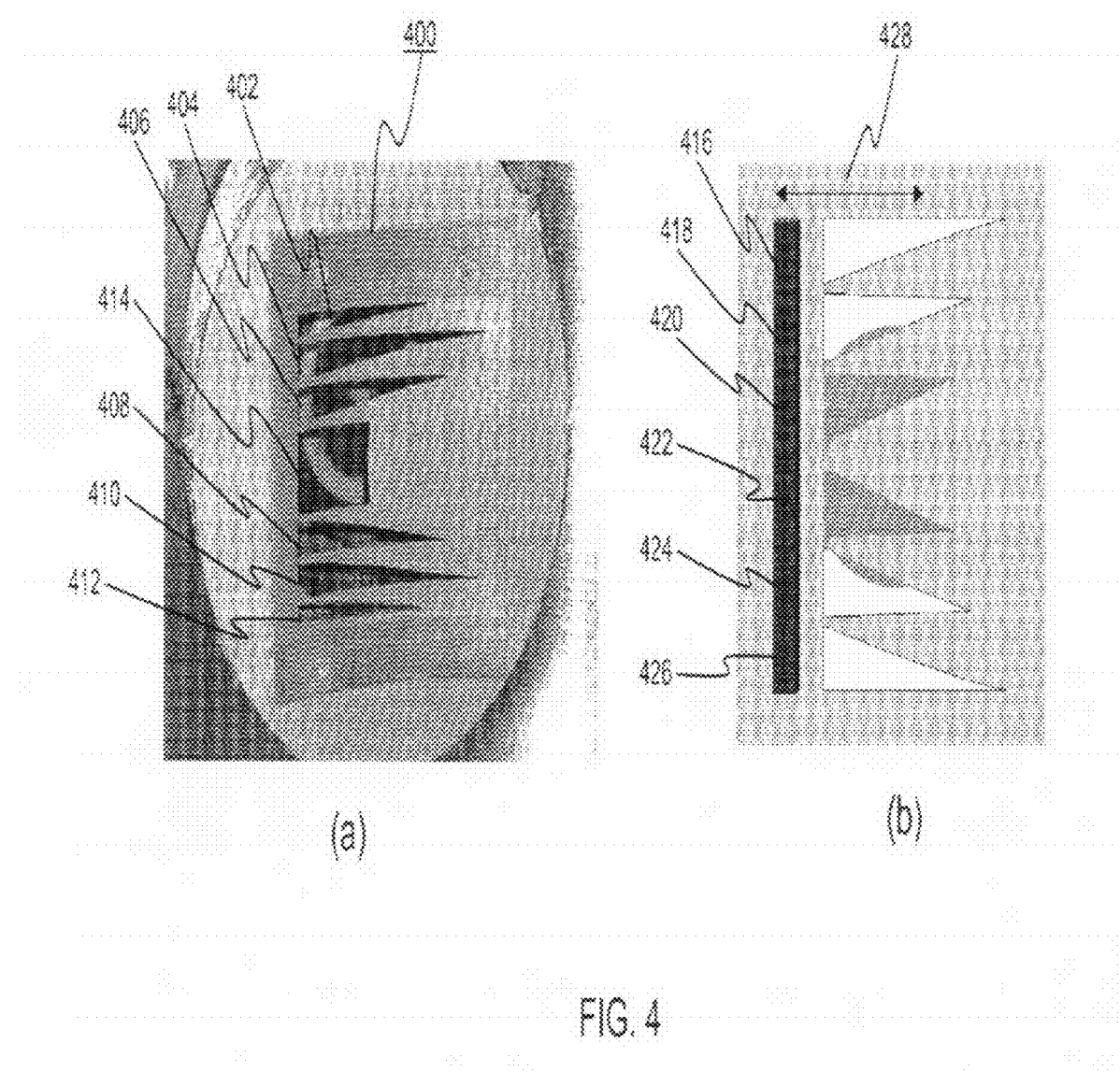
FIG. 4(a) illustrates a mask 400 that is used to grow the multilayer sections and the compensation layer according to an exemplary embodiment.
FIG. 4(b) illustrates the geometry of the mask as illustrated in FIG. 4(a) aligned with several substrates.

FIGS. 4(a) and 4(b) illustrate a mask 400 that is used to grow the multilayer sections 202, 206 and the compensation layer 204, and the geometry of the mask 400 aligned with substrates, respectively, according to an exemplary embodiment. Referring to FIG. 4(a), the saw-tooth shape mask 400 has six saw-teeth 402, 404, 406, 408, 410, 412 each of which may be configured to align with six corresponding substrates 416, 418, 420, 422, 424, 426 as illustrated in FIG. 4(b). The square opening 414 in the mask is a provision to monitor the status of the film such as the thickness and stress of the film. The shape and size of each of the saw-teeth may be determined based on the required in-plane thickness gradient of multilayer sections 202, 206 and compensation layer 204 of wedge-type MLL 200.

Mask 400 may be placed on top of a sputtering target (not shown) of the sputtering system maintaining a predetermined distance with the target. Since the amount of the out-coming particles from the sputtering target depends upon the size and shape of the openings in the mask 400, a thin film layer with a predetermined thickness gradient may be formed on the substrate when the appropriately aligned substrates are traversed at a predetermined constant speed over the mask as indicated by arrow 428 of FIG. 4(b). In this set up, after depositing one layer, a next layer which is thicker than the previous layer would be deposited in the same way but with different speed of the substrate that travels over of the sputtering target.

While the saw-tooth shaped mask 400 has been used to form the in-plane thickness gradient in this exemplary embodiment, different techniques may be used to achieve the same result. For example, the speed of the substrate as it travels over the target may be dynamically set for each layer so that the in-plane thickness gradient of each layer may be achieved by varying the speed of the substrate alone, without using the specifically designed mask. Also, it is to be understood that the deposition rate of the thin film depends upon other sputtering parameters, such as the power of the sputtering gun, the degree of the vacuum of the sputtering chamber, the distance between the target and the mask, and the distance between the mask and the substrate and the like.

Figure 5:
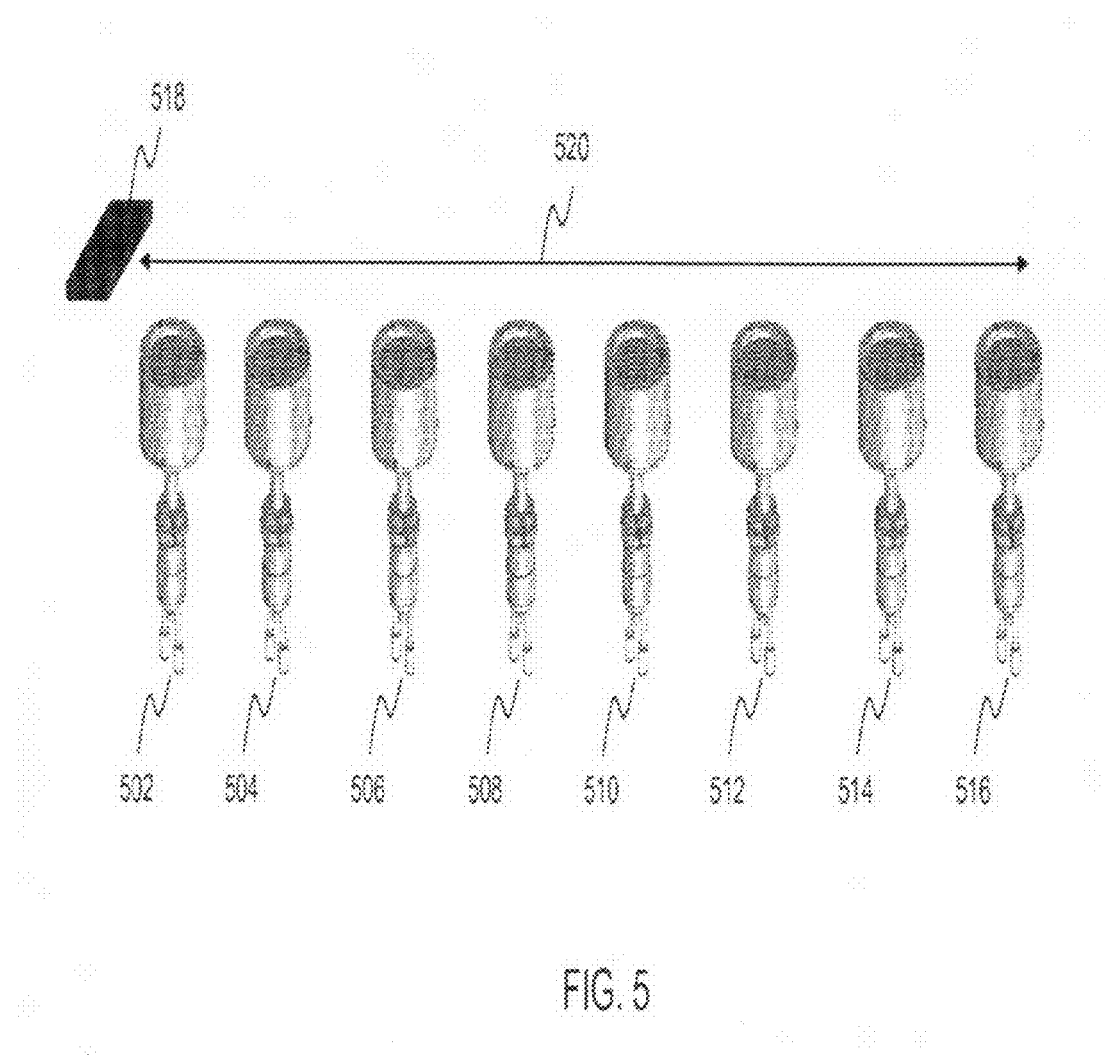
FIG. 5 illustrates a schematic diagram of a linear sputtering system 500 according to an embodiment.

FIG. 5 illustrates a schematic diagram of a linear sputtering system 500 used to fabricate wedge-type MLL 200 according to an embodiment of the present invention. The linear sputtering system 500 of the present invention includes a linearly-aligned eight sputtering guns 502, 504, 506, 508, 510, 512, 514, 516 each configured to deposit a single layer. For example, each of the guns may be equipped with an appropriate target such as $WSi_2$ or Si, as well as a mask, such as mask 400 for a single layer. A substrate 518 such as a Si wafer, having a size of 1"×½" may travel over the eight sputtering guns along the direction of arrow 520, sequentially depositing alternating layers of material. In an exemplary embodiment, each of guns 502, 504, 506, 508, 510, 512, 514, 516 may be equipped with targets for $WSi_2$, Si, $WSi_2$, Si, $WSi_2$, Si, $WSi_2$, Si, respectively, as well as the mask 400, to deposit the wedged alternating layers of $WSi_2$/Si, while the substrate 518 travels along the direction of arrow 520. It is noted that compensation layer 204 may be deposited either by an additional gun (not shown), or by one of the eight guns. Although the present system uses eight linearly-aligned guns, the number of the guns may be determined based on various factors, such as the number of total layers to be deposited and efficiency of the film growing process, and the like.

Figure 6:
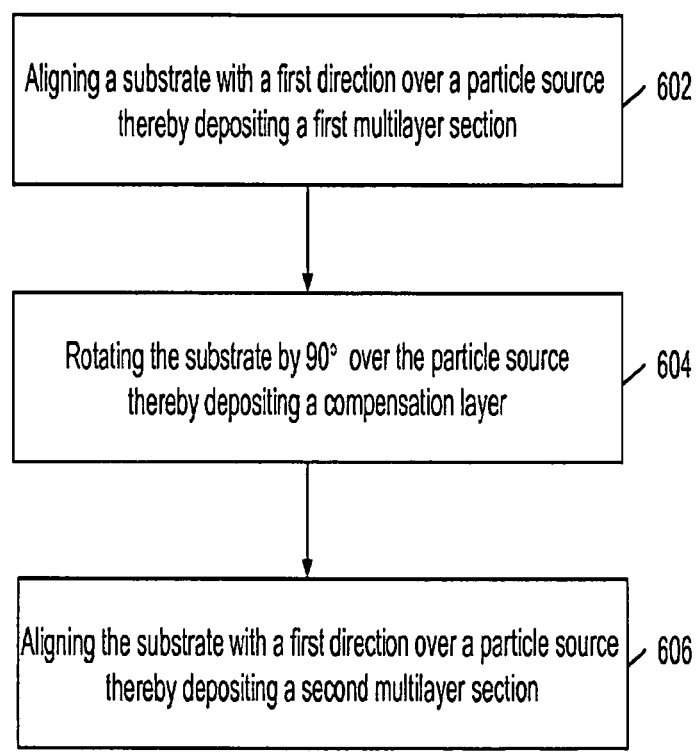
FIG. 6 illustrates a series of operational steps for fabricating multilayers 202, 206 and compensation layer 204 of wedge-type MLL 200 using linear sputtering system 500 as illustrated in FIG. 5.

FIG. 6 illustrates a series of operational steps for fabricating multilayers 202, 206 and compensation layer 204 of wedge-type MLL 200 using the linear sputtering system 500 as illustrated in FIG. 5. A substrate 518 is prepared and placed inside the processing chamber of the sputtering system 500, which is equipped with eight linearly-aligned sputtering guns each covered with mask 400, as explained above. It is noted that the substrate 518 may be aligned over the sputtering guns in a first direction 520 as illustrated in FIG. 5. The sputtering system 500 may then be evacuated using a vacuum pump, such as a cryopump. When the processing chamber reaches a predetermined pressure, such as $1\times10^{-9}$ Torr, a processing gas, such as Ar, may be fed into the chamber and a high voltage is applied to generate a plasma within the chamber. Subsequently, each of the eight targets for $WSi_2$ and Si, placed inside the corresponding guns may be activated, and the substrate 518 begins to travel over the guns with a constant speed, thereby depositing thin films on the substrate 518.

After traveling over the linearly-aligned eight sputtering guns each equipped with a saw-tooth shaped mask 400, as explained above, eight alternating layers may be deposited on substrate 518. By repeating the movement of the substrate 518 over the eight multiple guns, a predetermined number of alternating layers are deposited on the substrate 518, forming first multilayer section 202 of wedge-type MLL 200 (step 602). The thickness of each alternating layer has been monotonically increased by depositing first multilayer section 202. In an exemplary embodiment, a total of 2080 $WSi_2$/Si alternating layers are deposited as the first multilayer section 202. It is to be understood that an appropriate thickness and gradient of each layer may be predetermined and controlled by software during the sequential deposition of these layers.

Subsequently, compensation layer 204 that has been laterally offset by 90° may be formed on top of first multilayer section 202, using either one of the eight guns that has $WSi_2$ target or an independent gun (step 604). The gun for depositing the compensation layer 204 may also be equipped with a saw-tooth shaped mask 400 if the focal-length requires this layer to have an in-plane gradient, or a slit mask for a simple orthogonal gradient. To achieve the lateral offset feature of the compensation layer 204, the substrate may be tilted by 90° for the deposition with reference to the substrate direction set for the first multilayer section. Alternatively, instead of tilting the substrate, a velocity profiling may be utilized. For example, the substrate may be accelerated through the beam to have a gradient across a 90° offset atomic-flux aperture, thereby providing a laterally offset gradient. The velocity-profiling method will create a condition in which a greater atomic-flux is accumulated on the substrate portions having a relatively slower velocity, and a smaller atomic-flux is accumulated on the substrate portions having a relatively faster velocity. As a result, the gradient of the compensation layer 204 is parallel to the substrate translation. In contrast, the gradient of the first multilayer section 202 is in the direction perpendicular to the substrate translation.

Substrate 518 having first multilayer section 202 and compensation layer 204 may then again travel along arrow 520 over the multiple guns, repeatedly, depositing second multilayer section 206, having a total of 2080 alternating layers on compensation layer 204 (step 606). It is noted that the substrate 518 may be tilted back to the first direction if the substrate was tilted by 90° for the deposition of the compensation layer 204. It is also noted that the thickness of each alternating layer has been monotonically decreased for depositing the second multilayer section 206 in this embodiment where the middle-through-deposition technique has been employed.

Alternatively, instead of using the middle-through-deposition technique for the first multilayer section 202, a different fabrication technique may be used to sequentially deposit the compensation layer 204 and to form the second multilayer section 206. As an example, each of the first and second multilayer sections 202, 206 may be fabricated separately, where one of the multilayer sections has a compensation layer 204. The two multilayer sections 202, 206, fabricated separately with the compensation layer 204 present on one of the two sections 202, 206, may then be combined using an appropriate bonding method such as a metal bonding to form a complete zone-plate MLL.

Substrate 518 having first multilayer section 202, compensation layer 204 and second multilayer section 206 may be cut into an appropriate size, polished and/or dry-etched to make a completed wedge-type MLL. The substrate coated with the first multilayer section, compensation layer and second multilayer section may be covered by a damage-reduction agent before the cutting and polishing process. For example, a separate wafer may be bonded on top of the second multilayer section, thereby protecting the coated wafer from the damages during the cutting and polishing procedures.

Figure 7:
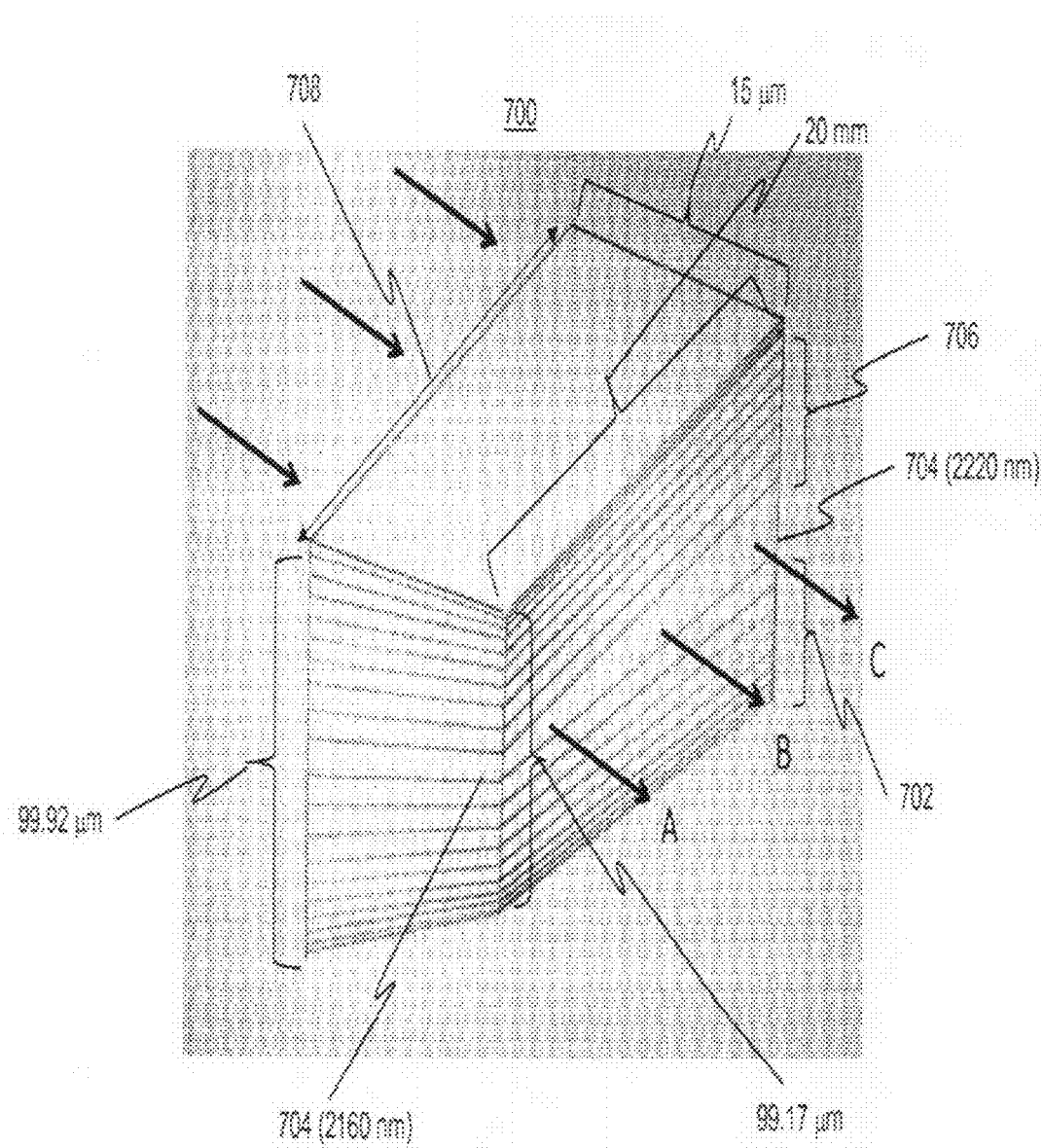
FIG. 7 illustrates a completed wedge-type MLL 200 after a polishing process.

FIG. 7 illustrates a completed wedge-type MLL 700 after a polishing process as an exemplary embodiment. The completed wedge-type MLL 700 includes first multilayer section 702, compensation layer 704 and second multilayer section 706. In this exemplary embodiment, a total of 2080 layers are formed for each of the first and second multilayer sections 702, 706. The MLL device is then diced and polished to have a width of 20 mm and depth of 15 µm. The device thicknesses at a light-entering side and a light-exit side are 99.92 µm and 99.17 µm, respectively assuming a focal length of 1 mm and 15 µm section thickness. In particular, as illustrated in FIG. 7, the compensation layer 704 is formed to have a 60 nm gradient ranging from 2220 nm at the thickest side to 2160 nm at the thinnest side. Thicknesses of the outermost layer and subsequent layer are 12.0139 nm and 12.0168 nm, respectively, differing by 0.029 Å for this exemplary embodiment.

The completed wedge-type MLL 700 may then be put on a test grid and scanned by X-rays. The scanning may be performed laterally across the device that has 20 mm width along the direction of arrow 708. As the X-ray beam scans across various positions of the 20 mm-long section, the foci from the two "halves" of the completed wedge-type MLL will meet at only one position. For example, when the X-ray scans three regions A, B, C as indicated in FIG. 7, only the foci at region B will meet, giving a maximum focusing efficiency and smallest spot size at this region. Once the scanning procedure finds a best location as a focusing point, the completed wedge-type MLL may be used for X-ray focusing repeatedly using the same focusing point. In this exemplary embodiment, a line focus with 33% efficiency is achieved using X-rays of 19.5 KeV.

It will be appreciated by persons skilled in the art that the present description of MLLs is not limited to what has been particularly shown and described in this specification. Rather, the scope of the present MLLs is defined by the claims which follow. It should further be understood that the above description is only representative of illustrative examples of embodiments. For the reader's convenience, the above description has focused on a representative sample of possible embodiments, a sample that teaches the principles of the present invention. Other embodiments may result from a different combination of portions of different embodiments.

The description has not attempted to exhaustively enumerate all possible variations. The alternate embodiments may not have been presented for a specific portion of the invention, and may result from a different combination of described portions, or that other undescribed alternate embodiments may be available for a portion, is not to be considered a disclaimer of those alternate embodiments. It will be appreciated that many of those undescribed embodiments are within the literal scope of the following claims, and others are equivalent. Furthermore, all references, publications, U.S. patents, and U.S. Patent Publications cited throughout this specification are incorporated by reference as if fully set forth in this specification.

The invention claimed is:

1. A multilayer Laue lens comprising:
   a first multilayer section formed on a substrate including a plurality of alternating layers made of a pair of two different materials;
   a compensation layer formed on the first multilayer section;
   a second multilayer section formed on the compensation layer including a plurality of alternating layers made of a pair of two different materials,
   wherein an in-plane thickness gradient of the compensation layer is laterally offset by 90° as compared to other layers in the first and second multilayer sections.

2. The multilayer Laue lens of claim 1, wherein each of layers in the first and second multilayer sections has an in-plane thickness gradient to form a wedge-type multilayer Laue lens.

3. The multilayer Laue lens according to claim 1, wherein the alternating layers of the first multilayer section have a thickness that is monotonically increased so that a layer adjacent to the substrate has a minimum thickness, and wherein the layers of the second multilayer section have a thickness that is monotonically decreased so that a layer adjacent to the compensation layer has a maximum thickness.

4. The multilayer Laue lens according to claim 1, wherein the pair of two different materials is made by at least one of $WSi_2/Si$, $W/Si$, $W/B_4C$, $W/C$, $Mo/Si$, $MoSi_2/Si$, $Mo/B_4C$, $Ni/B_4C$ and $Al_2O_3/B_4C$ pairs.

5. The multilayer Laue lens according to claim 1, wherein the alternating layers of the first multilayer section have a composition that is symmetrical to the alternating layers of the second multilayer section along with an optical axis of the device.

6. An X-ray focusing system comprising:
   a light source that generates an X-ray beam to be focused;
   a grid configured to receive the multilayer Laue lens recited in claim 1; and
   a scanning mechanism configured to scan the multilayer Laue lens using the X-ray, thereby locating an area of the multilayer Laue lens that shows a focusing efficiency better than a predetermined value.

7. A method of making a multilayer Laue lens, comprising:
   aligning a substrate with a first direction over a particle source depositing a quantity of particles, thereby depositing a first multilayer section including a plurality of alternating layers made of a pair of two different materials on the substrate;
   varying the quantity of particles incrementally deposited on the first multilayer section along the first direction, thereby depositing a compensation layer on the first multilayer section;
   aligning the substrate with the first direction over the particle source, thereby depositing a second multilayer section including a plurality of alternating layers made of a pair of two different materials,
   wherein the compensation layer is deposited such that an in-plane thickness gradient of the compensation layer is laterally offset by 90° as compared to other layers in the first and second multilayer sections.

8. The method of claim 7, wherein the first and second multilayer sections are deposited such that each of the alternating layers of the first and second multilayer sections has an in-plane thickness gradient to form a wedge-type multilayer Laue lens.

9. The method according to claim 7, wherein the first multilayer section is formed on the substrate such that thickness of the alternating layers is monotonically increased so that a layer adjacent the substrate has a minimum thickness.

10. The method according to claim 7, wherein the pair of two different materials is made by at least one of $WSi_2/Si$, $W/Si$, $W/B_4C$, $W/C$, $Mo/Si$, $MoSi_2/Si$, $Mo/B_4C$, $Ni/B_4C$ and $Al_2O_3/B_4C$ pairs.

11. The method according to claim 7, wherein the first multilayer section and the compensation layer are formed on a first substrate, and the second multilayer section is formed on a separate substrate different from the first substrate.

12. The method of claim 11, further comprising bonding the substrate having the first multilayer section and the compensation layer, and the separate substrate having the second multilayer section such that the compensation layer of the substrate and an outermost layer of the second multilayer section of the separate substrate are bonded together along with an optical axis, thereby forming a complete multilayer Laue lens.

13. The method according to claim 11, wherein the bonding is performed in such a way that the alternating layers of the first multilayer section is symmetrical to the alternating layers of the second multilayer section along with the optical axis of the device.

14. The method according to claim 7, wherein a sputtering system is utilized for the deposition device to form the first and second multilayer sections, and the compensation layer.

15. The method of claim 14, wherein the sputtering system includes a plurality of linearly-aligned sputtering guns.

16. The method according to claim 7, wherein the varying step is accomplished by rotating the substrate by 90° over the particle source with reference to the first direction.

17. The method according to claim 7, wherein the varying step is accomplished by accelerating the substrate within a chamber of the deposition device to deposit the compensation layer so that the compensation layer has a laterally gradient offset.

* * * * *